T. M. R. MEIKLEHAM.
DISTRIBUTING AND MEASURING SYSTEM FOR ELECTRICITY.
APPLICATION FILED JAN. 13, 1910.
1,120,074.
Patented Dec. 8, 1914.
3 SHEETS—SHEET 1.
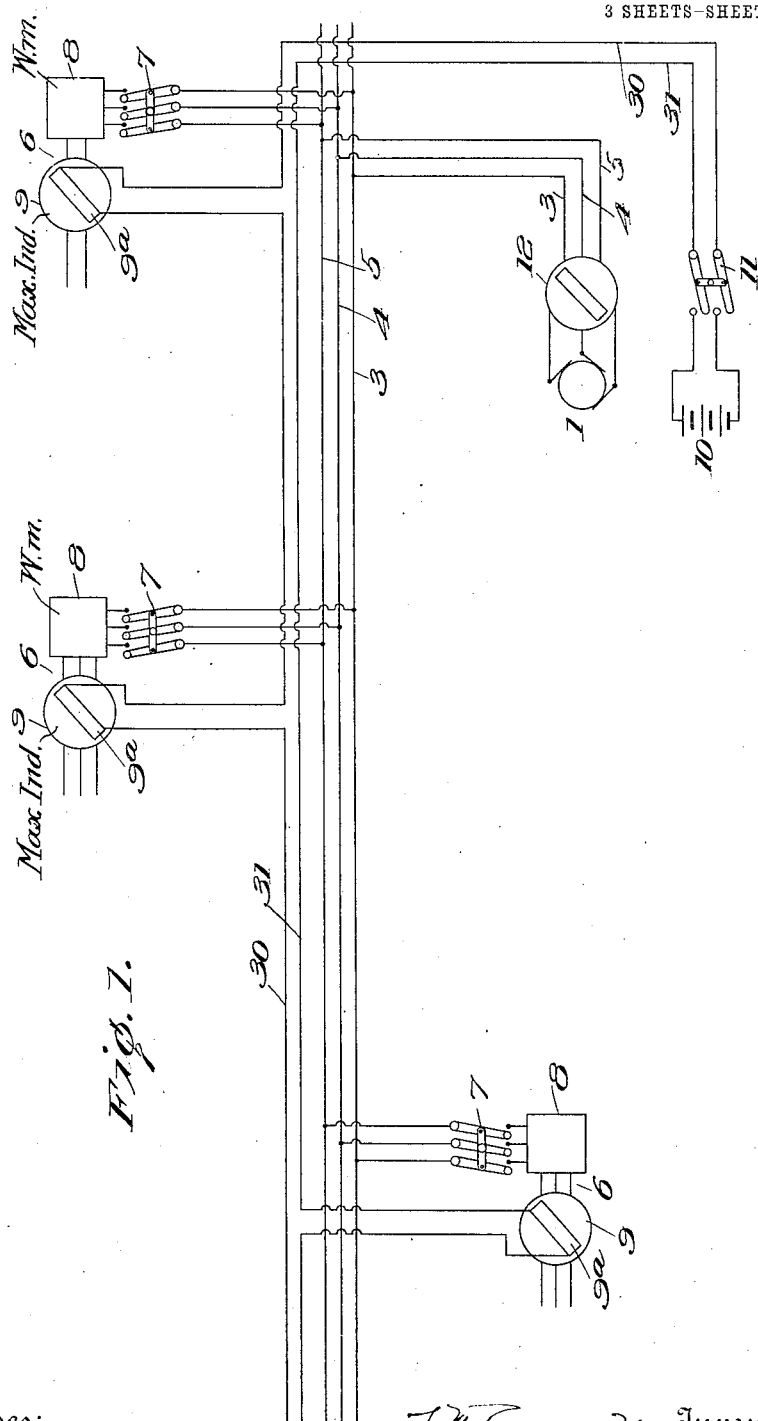

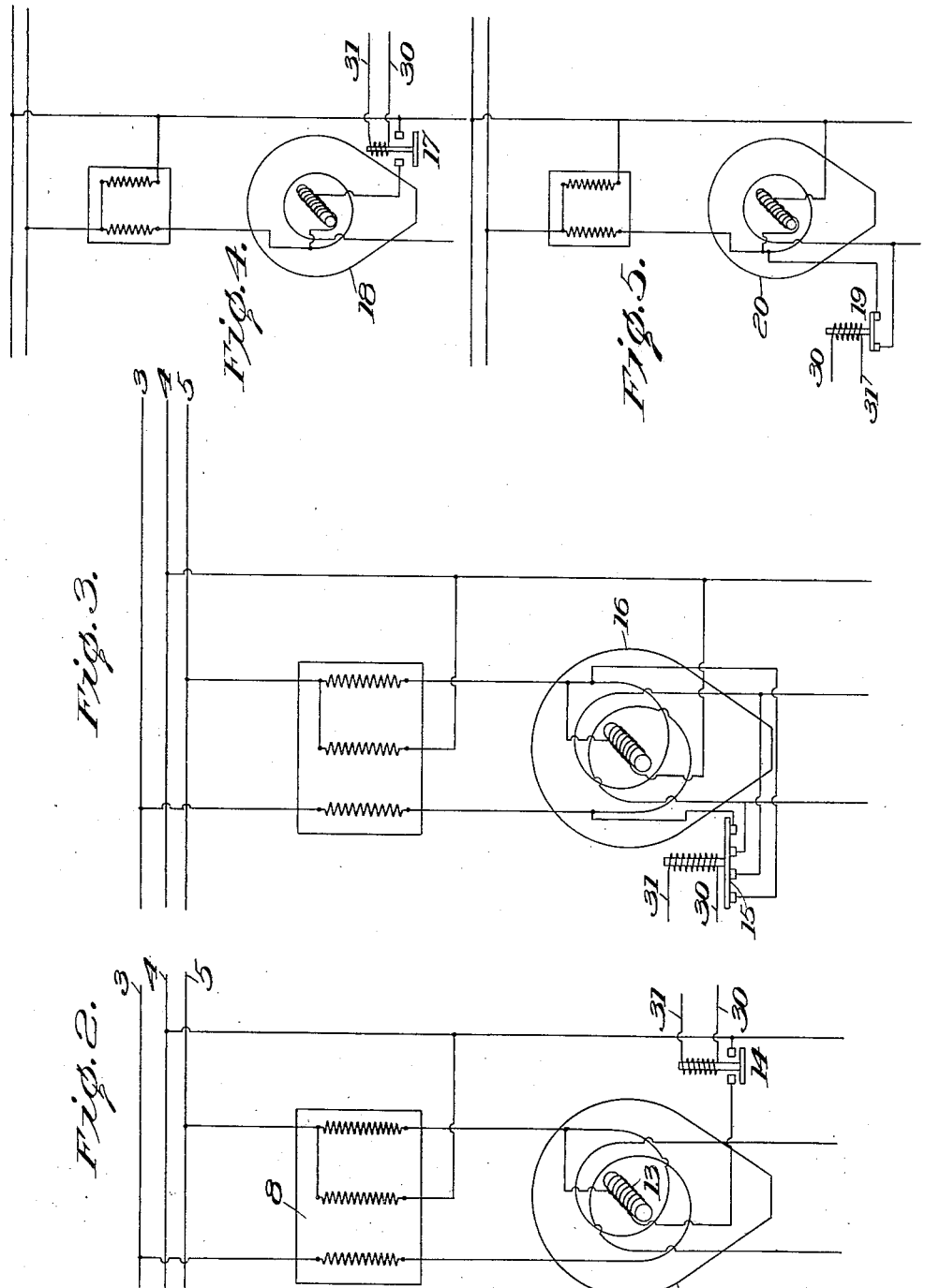

T. M. R. MEIKLEHAM.
DISTRIBUTING AND MEASURING SYSTEM FOR ELECTRICITY.
APPLICATION FILED JAN. 13, 1910.
1,120,074.
Patented Dec. 8, 1914.
3 SHEETS—SHEET 3.
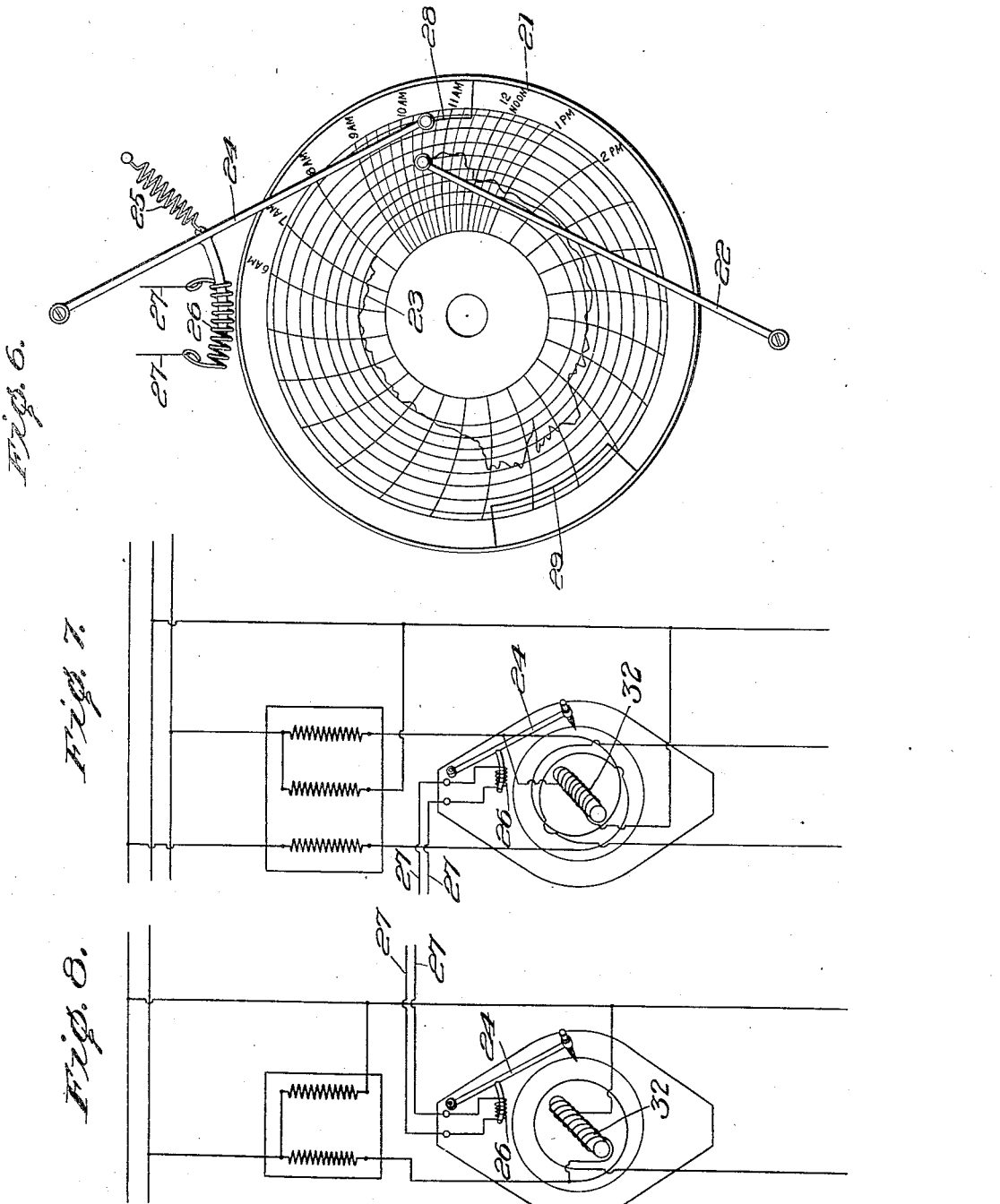

UNITED STATES PATENT OFFICE.

THOMAS M. R. MEIKLEHAM, OF NEW YORK, N. Y.

DISTRIBUTING AND MEASURING SYSTEM FOR ELECTRICITY.

1,120,074.  Specification of Letters Patent.  Patented Dec. 8, 1914.

Application filed January 13, 1910. Serial No. 537,948.

*To all whom it may concern:*

Be it known that I, THOMAS M. RANDOLPH MEIKLEHAM, a citizen of the United States, residing in the city, county, and State of New York, have invented certain new and useful Improvements in Distributing and Measuring Systems for Electricity, of which the following is a specification.

My invention relates to distributing systems for both alternating and direct current, and has special reference to means for measuring the plant capacity required by each consumer during peak of the load, or the time or times each day when the total load on the power house or central source of supply is at a maximum.

It is well known that the maximum load of the ordinary light and power station is much larger than the average load, and it is also well understood that the cost of the installation and maintenance and of the total production of current, is materially increased by the peaks, which may be, and usually are, of only short duration.

The object of my invention is to provide means whereby each customer's actual load may be indicated and recorded during the actual peak at the power house. This object is accomplished by means of a double meter system, one system being that now ordinarily in use, consisting of integrating wattmeters for recording the total power consumption by each consumer, and located at each consumer's premises, and the other a graphic recording meter, one of which is also located at each consumer's premises, and all of which graphic meters may be thrown into and out of operation from the central station.

Referring to the drawings accompanying and forming a part of this specification, Figure 1 shows the system of wiring and arrangement of meters, according to my invention, for a three-wire distributing system; Fig. 2 shows one method of arranging a graphic recording meter in a three-wire alternating system, for use on a consumer's premises, so that it may be thrown into and out of connection from a central power station; Fig. 3 shows an alternative method of arranging the same meter; Fig. 4 shows an arrangement for such a meter in a two-wire distributing system (either alternating or direct current), and Fig. 5 shows an alternative method of arranging the same system; Fig. 6 shows how a graphic recording instrument, such as is ordinarily used in a power station for continuously recording energy, may be modified and so controlled from the station as to record the time of peak of load; Fig. 7 shows the meter of Fig. 6 incorporated in a three-wire system, and Fig. 8 shows it in a two-wire system.

Referring in detail to the drawings, 1 is a dynamo adapted to operate any electric light and power system; from the dynamo, conductors 3, 4 and 5 lead to consuming stations 6; at each station the current passes through a switch 7, an ordinary integrating wattmeter 8, and through the stationary coils of the graphic recording ammeter or wattmeter 9. The movable coils $9^a$, controlling the indicating pointers (not shown) of the meters 9, are energized from a separate source of current 10 through the independent circuit 31. The current in this circuit is controlled from a switch 11, and may be turned on or off, thus throwing the graphic recording meters into or out of operation from the central station. The object of this particular arrangement is to permit the station attendant, whenever the station indicator 12 records a peak, to close the switch 11 and indicate on each consumer's recording meter the amount of peak caused by the individual consumers.

In Fig. 2, which illustrates a modified arrangement of meters at a customer's premises, the numerals 3, 4 and 5 designate the power circuit which passes through the integrating wattmeter 8 and through the graphic recording meter 12. The meter 12 is so wired that the potential coil 13 may be cut in and out of operation by means of a solenoid switch 14. This solenoid switch 14 may be controlled from the central station by means of the independent circuit 30—31 in the same manner as the potential coils in the arrangement of Fig. 1.

In Fig. 3, which illustrates another arrangement of meters at a customer's premises, the numeral 15 designates a solenoid switch adapted to short-circuit the current coils of the graphic recording meter 16, and throw it into and out of operation. The switch 15 may be operated in the same manner as switch 14 of Fig. 2, and serves the same purpose.

In Fig. 4, which illustrates another arrangement of meters, the solenoid switch 17 is adapted to short-circuit the potential coil in meter 18, inserted on a consumer's premises on a two-wire system.

In Fig. 5, the solenoid switch 19 is adapted to throw the recording meter 20 into or out of operation by short-circuiting or throwing into line the stationary coils forming a part of the meter.

In the arrangements shown in Figs. 1 to 5 inclusive, the graphic recording meters at the customer's premises are all normally out of operation and are adapted to be thrown into operation from the central station and to record the individual user's rate of consumption at peak load.

Fig. 6 illustrates an ordinary recording meter having a dial moved by a clock mechanism and a recording needle adapted to trace on the dial a line indicating the rate of power consumption. This meter I have modified by the addition of a second indicating pointer controlled from the central station, and which may be made to record the time or times of maximum load. In this figure the dial 21 is that of an ordinary recording meter having an indicating pointer 22 constantly in operation and recording a line 23 on the face of the dial. The indicating pointer 24 is the additional recording needle provided to carry out the object of my invention. This pointer is normally held by a spring 25 out of operative position or on the outer margin of the dial. Whenever the peak load occurs and is indicated at the central station by the meter, the pointer 24 may be brought into operation on the face of the dial by means of a coil 26 controlled from the central station by leads 27 extending to the central station and controlled by any suitable switch. Whenever the needle 24 is kept in operation, it records a substantially uniform curved line on the face of the dial, as at 28 and 29. It may be made to record merely the point of the peak. This can be accomplished by momentarily energizing the solenoid 26. The curved lines indicate on the consumer's dial the time of maximum or peak station load and, in connection with the record made by pointer 22, shows the amount of current consumed by the consumer at such time.

In Figs. 7 and 8, the numeral 32 indicates the movable or potential coil adapted to operate a needle, such as is shown at 22 in Fig. 6, and it is shown incorporated in meters connected with three-wire and two-wire systems respectively.

In the arrangement shown in Fig. 1, or when modified as stated above and shown in Figs. 2, 3, 4, 5, 6, 7, and 8, the operation is substantially the same. The operator in charge at the central station determines when the peak load arrives by watching the station meters. As soon as the peak load is reached, the consumers' graphic recording meters (if the arrangement be that of Figs. 1 to 5) or the extra recording pointers (if the arrangement be that of Figs. 6 to 8) are thrown into operation all at one time from the central station, and they record the amount of power used by each consumer during the time the peak load continues, and this amount is taken into consideration in making up the consumer's bill.

It should be understood that any source of current may be employed for cutting in and out the graphic meters, and that they may be connected either in series or parallel. Where an extra recording pointer is used, such as is shown in Fig. 6, its range of movement should be such that it will not interfere with the other recording pointer.

Having thus described these forms or embodiments of my invention, I do not wish to be understood as being limited to the exact details, form and arrangement of parts set forth, for various changes may be made without departing from the spirit and scope of my invention.

What I claim and desire to protect by Letters Patent is:

1. In an electrical distributing system, a distributing station, a consuming station, and means to record the electrical consumption of said consuming station comprising a recording meter provided with means adapted to record electrical consumption continually and with means independently controlled to record simultaneously the time of any desired consumption.

2. In an electrical distributing system, a distributing station, a consuming station, and means to record the electrical consumption of said consuming station comprising a recording meter provided with two recording arms, one of which is adapted to record continually and the other of which is adapted to record only when placed in operative position by independently controlled means.

3. In an electrical distributing system, a distributing station, a consuming station, and means to record the electrical consumption of said consuming station comprising a recording meter provided with two recording arms adapted to operate upon a single moving dial, one arm being continually operative and one intermittently operative, a circuit extending from said distributing station to said consuming station and adapted to control the intermittently operative arm, and a switch located at the said distributing station for controlling said circuit.

4. In an electrical distributing system, a distributing station, a consuming station, and means to record the electrical consumption of said consuming station comprising a recording meter provided with two recording arms adapted to operate on a single moving dial, one arm being continually operative and adapted to measure the electrical consumption at the consuming station and one intermittently operative and adapted to measure time, a circuit extending from the distributing station to the consuming station and adapted to control the intermittently operative arm, and a switch located at the distributing station for controlling said circuit.

T. M. R. MEIKLEHAM.

Witnesses:
B. S. LACHLAU,
E. W. HASTINGS.